(12) United States Patent
Wang et al.

(10) Patent No.: US 6,641,261 B2
(45) Date of Patent: Nov. 4, 2003

(54) LENS FOR VISION ENHANCEMENT

(75) Inventors: Charles N. Wang, Campbell, CA (US);
Erhan H. Gunday, Santa Barbara, CA (US); Albert M. Jurgens, New Fairfield, CT (US); Eric C. Miller, Los Gatos, CA (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 09/972,479

(22) Filed: Oct. 6, 2001

(65) Prior Publication Data

US 2003/0076474 A1 Apr. 24, 2003

(51) Int. Cl.[7] ................................................. G02C 7/10
(52) U.S. Cl. .......................................... 351/44; 351/163
(58) Field of Search .............................. 351/44, 45, 46, 351/163, 165

(56) References Cited

U.S. PATENT DOCUMENTS

| 4,872,749 | A | * | 10/1989 | Lummis et al. | ............... 351/44 |
|---|---|---|---|---|---|
| 5,133,745 | A | * | 7/1992 | Falcetta et al. | ................. 623/6 |
| 5,235,358 | A | * | 8/1993 | Mutzhas et al. | ............ 351/163 |
| 5,274,403 | A | * | 12/1993 | Gott | ............................ 351/47 |
| 5,400,175 | A | * | 3/1995 | Johansen et al. | .............. 359/44 |
| 5,528,322 | A | * | 6/1996 | Jinkerson | .................... 351/163 |
| 5,756,010 | A | * | 5/1998 | Appell et al. | ................ 252/589 |
| 5,973,865 | A | * | 10/1999 | Havens et al. | ............... 359/885 |

* cited by examiner

*Primary Examiner*—Huy Mai
(74) *Attorney, Agent, or Firm*—Winston & Strawn LLP

(57) ABSTRACT

A lens transmits a maximum 2 percent average intensity of ultraviolet light and transmits a minimum 95 percent average intensity of light in a brightness perception spectrum of the eye. In addition, maximum percentages of violet and/or blue light are transmitted. In some cases, the lens transmits a maximum percentage average intensity of red light while transmitting the minimum 95 percent average intensity of light in the brightness perception spectrum. The lens is incorporated in protective eyewear, especially into eyewear used by medical personnel.

39 Claims, 11 Drawing Sheets

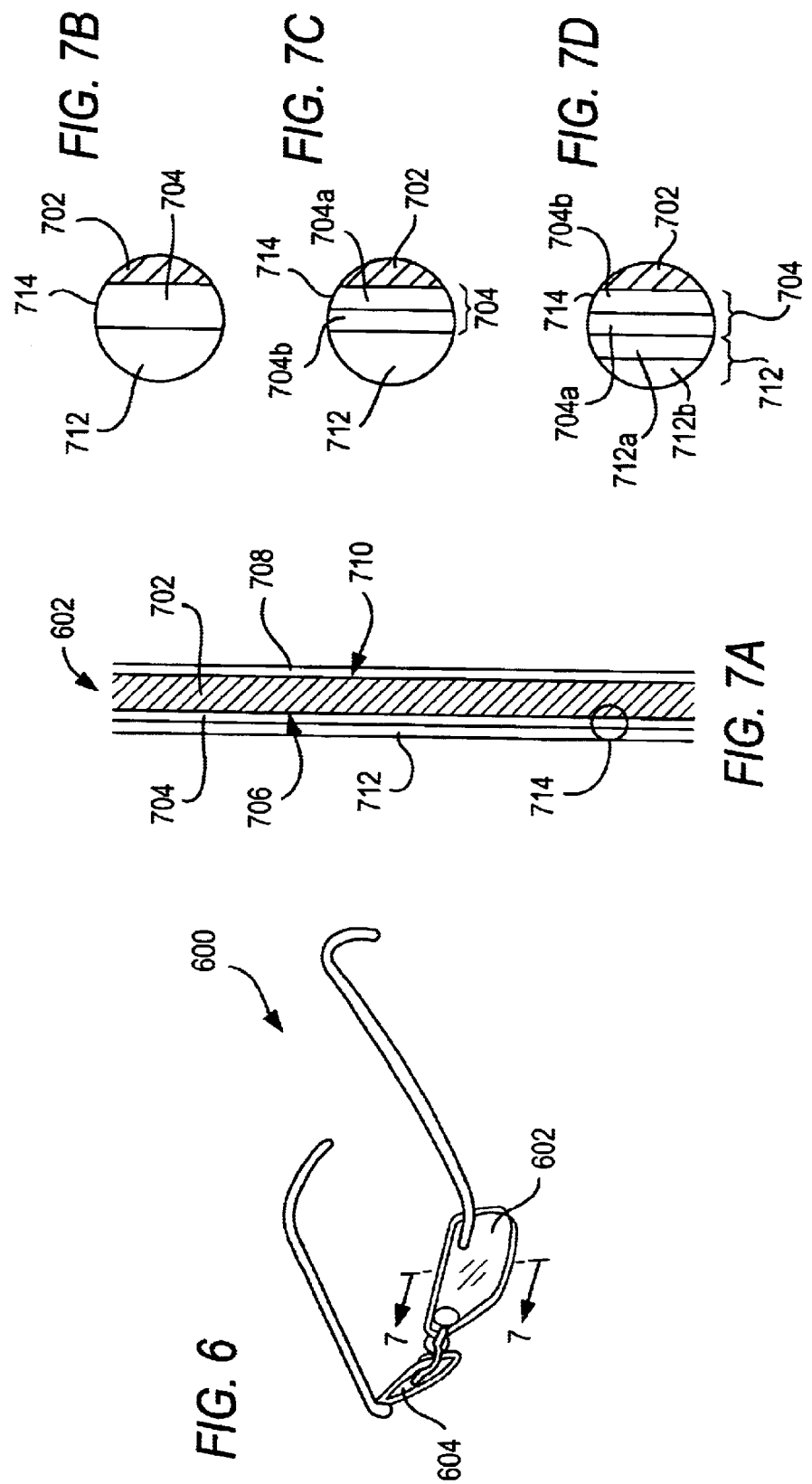

LENS FOR VISION ENHANCEMENT

CROSS-REFERENCE TO RELATED APPLICATIONS

This application is related to U.S. patent application Ser. No. 09/972,478 entitled "Eyewear for Two-Way Communication" by Eric C. Miller et al., filed concurrently, and to U.S. patent application Ser. No. 09/972,342 entitled "Information System Using Eyewear for Communication" by Eric C. Miller et al., filed concurrently, both of which are incorporated herein by reference.

BACKGROUND

1. Field of Invention

Embodiments relate to lenses blocking selected wavelength ranges of light, in particular to protective eyewear using such lenses, and more particularly to such protective eyewear worn by medical personnel.

2. Related Art

Medical personnel are subject to eyestrain when working under bright medical lighting. In many instances, for example, very bright, white lighting is used in surgical and examination rooms. In other instances, such as during endoscopic or arthroscopic surgery, background lighting is dimmed and medical personnel view bright video monitors. Such bright lighting typically contains ultraviolet (UV) and far violet (short violet wavelength) light that may cause both eyestrain and eye damage. Optical filters (e.g., conventional sunglasses) exist that block portions of the UV spectrum. But medical personnel must clearly see in order to carry out medical procedures, and such UV-blocking filters unacceptably darken the viewed scene. Medical personnel also identify different objects such as different tissues by color, but such darkening filters change the perceived colors of viewed objects. Thus certain qualities of light reaching the eye should be preserved to assist medical personnel.

Light is characterized by wavelength, often measured in nanometers (nm). Light radiated by most light sources contains a multiplicity of wavelengths. The spectral radiance of a specific light source is the intensity at each wavelength of light radiated by the source. Spectral radiance is typically plotted with intensity (often normalized) in the ordinate and wavelength in the abscissa.

Color may be a physical description of light, serving as a proxy for wavelength. Color may also refer to human perception of light incident on the retina. Various theories of human color perception exist. Humans can generally perceive light in a range of wavelengths from around 400 nm to around 750 nm. However, the human eye is not equally responsive to all visible wavelengths. Instead, the eye is responsive to light in three overlapping bands: a blue band centered on about 450 nm, a green band centered on about 540 nm, and a red band centered on about 600 nm. When light having a mixture of wavelengths strikes the retina, the brain perceives the mixture color as an average of the light energy received from the component wavelengths that fall within each responsive band. For example, if a mixture of blue light and yellow light is incident on the retina, the mind perceives the color of the light mixture as green, and does not distinguish the individual blue and yellow colors. Color is therefore what the human mind perceives when one or more wavelengths of light is incident on the retina.

Human eye response to light intensity in the visible spectrum varies by wavelength. FIG. 1 shows a representation of photopic (bright light) visual response of a typical human eye. Curve 102 is the strength of typical photopic visual response as a function of wavelength ($\lambda$) and is asymmetric. Range 104 from 700–400 nm is a typical photopic visual range. Ultraviolet light is light having wavelength shorter than approximately 400 nm. As set forth in ISO 8980–3:1999(E) "Ophthalmic optics—Uncut finished spectacle lenses—Part 3: Transmittance specifications and test methods", incorporated by reference, UV-A is defined from 380 to over 315 nm and UV-B is defined from 315 to over 280 nm. Therefore, one range of UV light is approximately 400–280 nm, and is shown as UV range 106. Range 108 from 425–400 nm is a range of short violet light wavelengths (far violet) that humans can perceive, but for which the eye response is small. The intensity of light incident on the retina is perceived as brightness.

A hue is the color perceived when a single wavelength of light strikes the retina. A typical person perceives hues in groups of reds (longer than about 610 nm), oranges (about 610–590 nm), yellows (about 590–570 nm), greens (about 570–500 nm), blues (about 500–440 nm), and violets (less than about 440 nm). A single wavelength of light is perceived as having a dominant hue.

A tint identifies a particular mixture of light wavelengths and intensities (i.e., the spectral radiance distribution of a particular light). A particular tint is perceived as a corresponding color. The tint of an object is defined by how that object radiates light, or by how that object selectively reflects or absorbs wavelengths of light that strike the object. The perceived tint of an illuminated object is also determined by the intensity of light at various wavelengths coming from the object. When an object is illuminated by light of a particular tint, the illuminated object is perceived as having a color corresponding to a tint which is a combination of the tint of the light mixed with the tint of the object.

Tints are expressed in various ways. Tints may be expressed as mixtures of three primary colors (e.g., red, green, and blue). Tints may also be expressed as chroma (hue) and saturation. Saturation indicates how much or little white light is mixed with a (pure) chroma to make the tint. In the CIELAB system, tints are described by coordinates ($L^*$, $a^*$, $b^*$). $L^*$ is luminosity (light or dark), $a^*$ is green-red balance, and $b^*$ is blue-yellow balance. A known spectral distribution of light can be mathematically transformed into CIELAB ($L^*$, $a^*$, $b^*$) coordinates using methods known by skilled artisans.

In the CIELAB system, $\Delta E$ is a measure of the variation between two tints, defined at coordinates ($L^*1$, $a^*1$, $b^*1$) and ($L^*2$, $a^*2$, $b^*2$), respectively. $\Delta E$ is calculated by using Equation 1:

$$\Delta E = \sqrt{(\Delta L^*)^2 + (\Delta a^*)^2 + (\Delta b^*)^2} \quad [1]$$

where $\Delta L^* = L^*1 - L^*2$, $\Delta a^* = a^*1 - a^*2$, and $\Delta b^* = b^*1 - b^*2$. During manufacturing, for example, Equation 1 is used to compare a specified tint to a tint produced by the manufactured product (e.g., a filter). A value of 3 for such a $\Delta E$ comparison is typically considered to be an acceptable manufacturing tolerance. For two identical tints, $\Delta E$ is zero.

FIG. 2 is the 1931 Commission Internationale de l'Eclairage (C.I.E.) Chromaticity Diagram with typical color perceptions shown. The C.I.E. Chromaticity Diagram provides a graphical representation of tints. Since three primary colors may define a tint, if the amount of one primary color is fixed, a particular tint is defined by specifying the amounts of the other two. Consequently, two numbers are sufficient to define a mixture of three primary colors, thereby defining a tint. The defined tint is graphically shown by plotting the defining numbers (x,y) on the horizontal (x) and vertical (y) axes of the Chromaticity Diagram. For example, tint 202 is a red tint at (0.6,0.3), tint 204 is a white tint at (0.3,0.3), and tint 206 is a yellowish-green tint at (0.3,0.6). Hues (identified by wavelength in FIG. 2) are shown around the outside border of the Diagram.

A MacAdams ellipse is an area of the C.I.E. Diagram defining a boundary around a tint such that a person typically does not distinguish differences among tints inside the particular MacAdams ellipse. As shown in FIG. 2, MacAdams ellipse 208 (shown exaggerated in size) is defined around tint 204. A typical person does not distinguish tints falling within ellipse 208 from tint 204.

The color white describes light having equal intensity at all wavelengths in the visible spectrum. The color white also describes a human perception. Various color description systems define the perceived color white in various ways. For example, the Chromaticity Diagram depicts white as being in a center portion of the Diagram, as shown in FIG. 2. People identify various tints as being white, although they distinguish among various "whites". For example, some "whites" may appear bluish; others reddish.

Objects heated to a sufficiently high temperature radiate light. A heated blackbody produces a continuous spectral radiance distribution with a single peak. As a blackbody is made hotter, the light it radiates becomes brighter (i.e., more energy is radiated at each wavelength in the radiance distribution) and the peak of the radiance distribution shifts towards shorter wavelengths.

The color temperature of a heated object, such as a lamp filament, is the temperature to which a blackbody must be heated to have approximately the spectral radiance distribution of the heated object. Thus a color temperature may be used as a model for the spectral radiance of an actual light source. Color temperature may be plotted on the Chromaticity Diagram. As shown in FIG. 3, curve 302 represents the tints of continuously increasing color temperature. A very low temperature light source radiates light perceived as being red. As the color temperature of the light source increases, the perceived color increases along line 302 from red to orange to white. The 4500° K. color temperature is shown at tint 304. The 9300° K. color temperature is shown at tint 306. Tint 308 represents the color temperature of an infinitely hot blackbody. Referring to FIG. 2, tints 304,306, 308 are typically perceived as white, although having an increasingly bluish tint as color temperature increases.

Typical medical lamps (e.g., surgical lighting systems produced by Berchtold Corporation of Charleston, S.C.) have approximately a 4500° K. color temperature. FIG. 4 is a graph showing spectral radiance distribution curve 402 of a 4500° K. blackbody over the visible spectrum. The spectral radiance distribution of light sources such as cathode ray tube (CRT) displays may also be modeled using color temperature. For example, the SONY TRINITRON CRT has three selectable color temperatures of 5400° K., 6500° K., and 9300° K., as well as user-defined color temperature settings. Since the CRT color temperature is higher than the surgical lamp color temperature, a particular white object displayed on the CRT will typically be perceived by an observer as having a more bluish tint than when that object is illuminated by a lower color temperature surgical lamp.

An optical filter selectively blocks light wavelengths. The filter may be described by the spectral radiance distribution of light (i.e., the tint) either blocked or passed. If the filter is described by the tint being passed, the filter's tint is combined (added) with the tint of the light incident on the filter to determine the tint of the light exiting the filter. If the filter is described by the tint being blocked, the filter's tint is subtracted from the tint of the light incident on the filter to determine the tint of the light exiting the filter.

Glare is stray light that interferes with a viewer's perception of a viewed object. Glare is caused by light from objects or the environment being reflected into the eye. Several methods reduce glare.

One method of reducing glare is to view an object through a filter that tints light passing through the filter. For example, conventional sunglasses are filters that help combat glare. But such filters unacceptably darken and change the colors of viewed objects. Another method of reducing glare is to apply a layer of linear polarizing material to a lens. Light tends to be polarized parallel to the reflecting surface. Many brightly illuminated surfaces such as roads and water tend to be horizontal, and so light reflected from such surfaces has horizontal polarization. Conventional "polarized" sunglasses have a layer of polarizing material with a vertical polarization (preference) that blocks horizontally polarized light. However, such polarizing material also darkens and changes the colors of viewed objects. A third method of reducing glare is to coat a lens with a conventional anti-reflective (AR) coating. Both single layer and multi-layer AR coatings exist. AR coatings may or may not tint light passing through the coating. The amount of light reflected at an interface between air and an optical material increases when the difference in refractive index between air and the material increases. Single layer AR coatings lower the change in index of refraction between the optical surface to which it is applied and the air, thus lowering the amount of internally reflected glare light. Multi-layer AR coatings use multiple reflections and interference to cancel glare.

Lenses that include easily damaged coatings or materials can be made with a scratch-resistant outer protective layer. Such a layer protects the underlying coatings and optical substrate from damage.

Medical personnel rely on tissue color for determining medical condition and identifying physical features. They also need bright lights for a clear view while executing medical procedures. FIG. 5 illustrates a typical operating room environment. Light is depicted in FIG. 5 by arrows directed towards the surgeon's eyes. Surgeon 502 wears protective eyewear 504. Wear of such eyewear is typically required by law or by hospital rules. Eyewear 504 may include corrective or non-corrective lenses. Light from various sources passes through lenses in eyewear 504 and is received in the surgeon's eye. For example, bright, white light from surgical lamp 506 (e.g., 4500° K. color temperature) is reflected into the surgeon's eyes by patient 508. Stray light from lamp 506 also reaches the surgeon's eyes directly, or is reflected by other objects such as cabinet 510. Light from background lighting 512 also reaches the surgeon's eyes directly and by reflection. Video monitor (CRT) display 514 outputs an image from arthroscopic light and camera probe assembly 516 of an illuminated internal body part. Surgeon 502 may use one or more optical instruments such as a microscope (not shown) during surgery. Light passing though lenses in such instruments reaches the surgeon's eyes.

Thus it is apparent that medical personnel working in an environment such as illustrated by FIG. 5 require protective eyewear that transmits light from many sources. Such eyewear should block harmful and straining elements (e.g., UV, far violet) of such light. At the same time, however, for procedures such as open surgery such blocking should not darken the surgeon's view of the operating field, nor should such blocking alter object colors within the operating field.

If endoscopic/arthroscopic surgery is performed, lamp 506 is turned off, background lighting 512 is dimmed, and the surgeon concentrates on display 514 which is easier to see in a darkened environment. Since the color temperature of display 514 is high (e.g., 9300° K.), however, some objects on the display may appear to have a bluish tint. Surgeons are typically trained under 4500° K. color temperature light, and so objects on display 514 will have a color different from that which the surgeon expects. Consequently, it is desirable to block harmful light from display 514 while at the same time preserving the perceived brightness of the display. It is also desirable to alter light output by display 514 so that colors of objects on the display are perceived to be as close as possible to colors of objects viewed with a more pure white light, such as the light produced by lamp 506. In addition, in some cases the surgeon is operating on a portion of the patient that includes several tissue types having similar tints (e.g., muscles, ligaments). If the illuminating light source and the illuminated objects both have tints shifted towards one part of the spectrum (e.g., illuminating red tissues with a low color temperature light source) the similarly tinted tissues are even more difficult to distinguish by color. It is therefore desirable to provide a way for the surgeon to more easily visually distinguish among objects having several similar tints.

SUMMARY

A lens transmits a maximum of 2 percent of average light intensity in the ultraviolet spectrum while transmitting a minimum of 95 percent of an average light intensity in the range of wavelengths associated with brightness perception. In one embodiment, the brightness perception range is defined as a minimum photopic response (e.g., 30 percent). In some embodiments the lens also blocks light in the far violet and/or blue spectra. Blocking the ultraviolet light prevents eye damage and eyestrain. Blocking the violet and/or blue light further prevents eyestrain, especially in surgical environments in which the color blue is common. Thus a surgeon's view of an object (e.g., an organ illuminated by a surgical spot lamp) is not unacceptably, or in some instances perceptively, darkened.

In some embodiments the lens also blocks light in the red spectrum. Such red blocking helps a person distinguish similarly red-tinted objects while viewing the objects through the lens. Some red-blocking embodiments may omit the blue-blocking feature.

A benefit of some violet- and blue-blocking embodiments is that objects illuminated by a particular color temperature light source appear when viewed through the lens to be illuminated by a lower temperature light source. When viewed through the lens, objects displayed on a relatively high color temperature video monitor are perceived to have tints closer to tints when viewed using the naked eye under a relatively lower color temperature surgical lamp. In a similar way, objects illuminated by relatively low color temperature light sources when viewed through red-blocking embodiments are perceived to be illuminated by a relatively higher color temperature light source.

BRIEF DESCRIPTION OF THE DRAWINGS

FIG. 6 is a perspective view of protective eyewear incorporating a lens embodiment.

FIG. 7A is a cross-sectional view of a lens, and FIGS. 7B, 7C, and 7D are detailed views of a portion of FIG. 7A.

DETAILED DESCRIPTION

Figure 1:
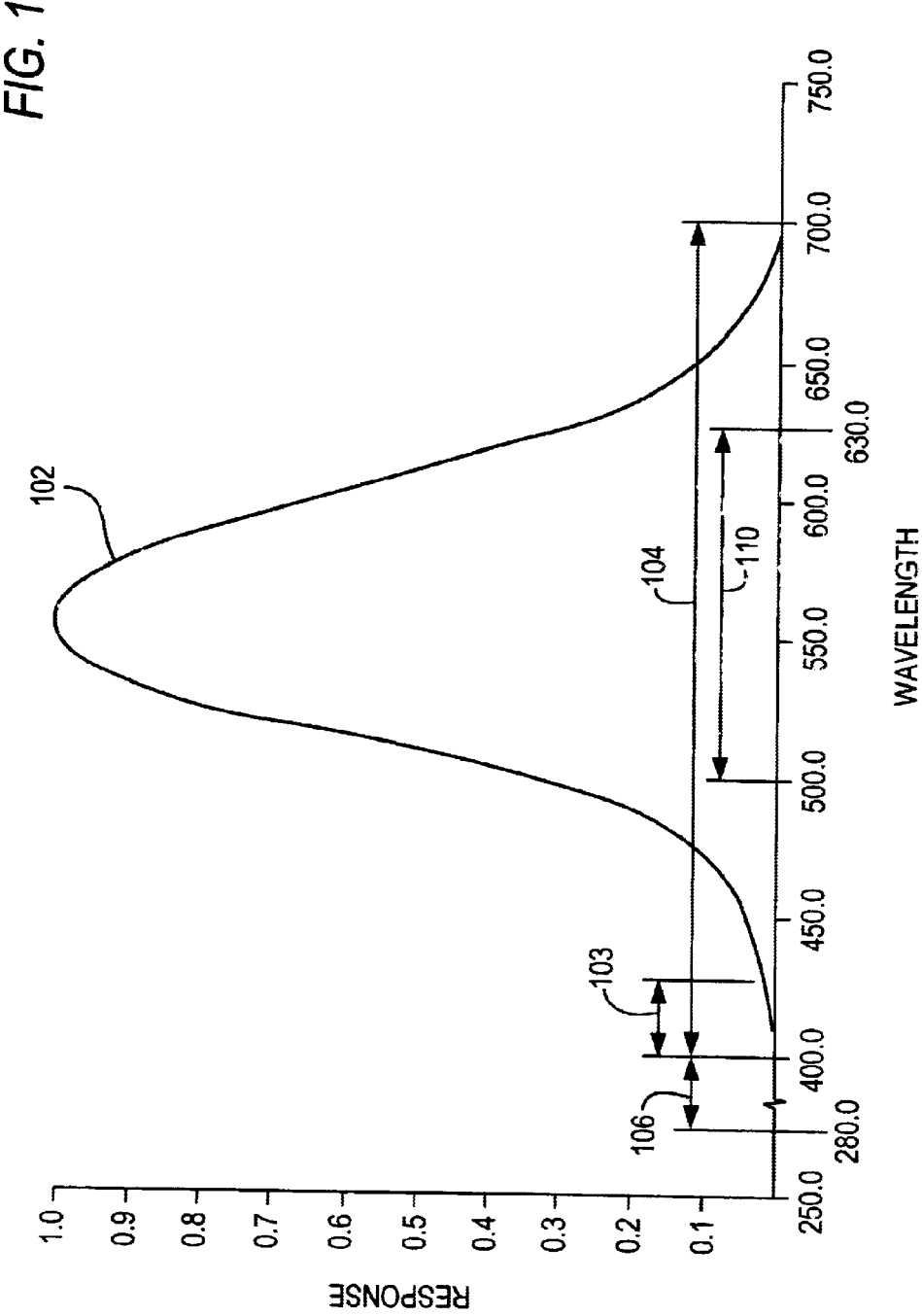
FIG. 1 is a graph plotting eye response versus wavelength.
Figure 2:
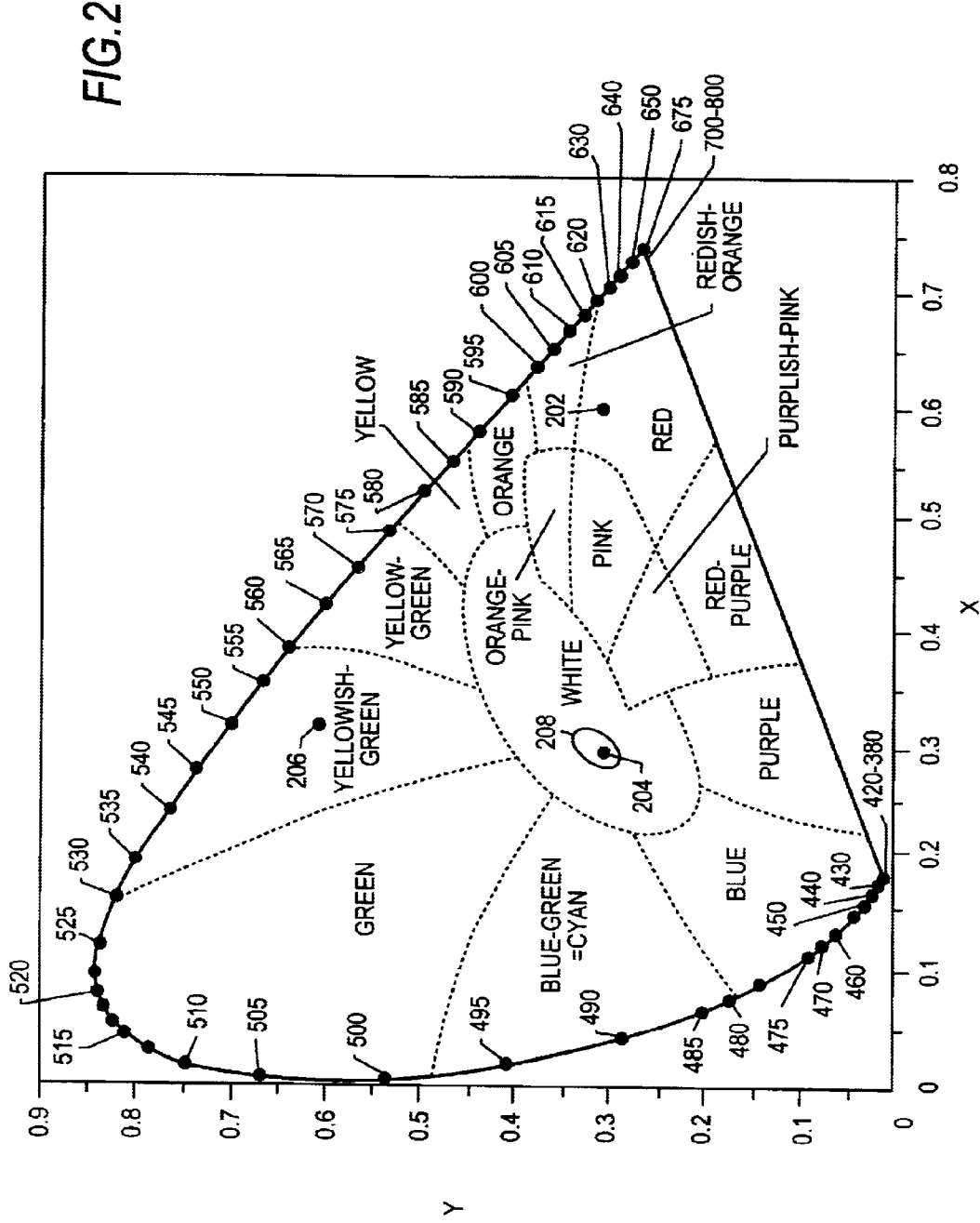
FIG. 2. is a C.I.E. Chromaticity Diagram on which several tints are plotted.
Figure 3:
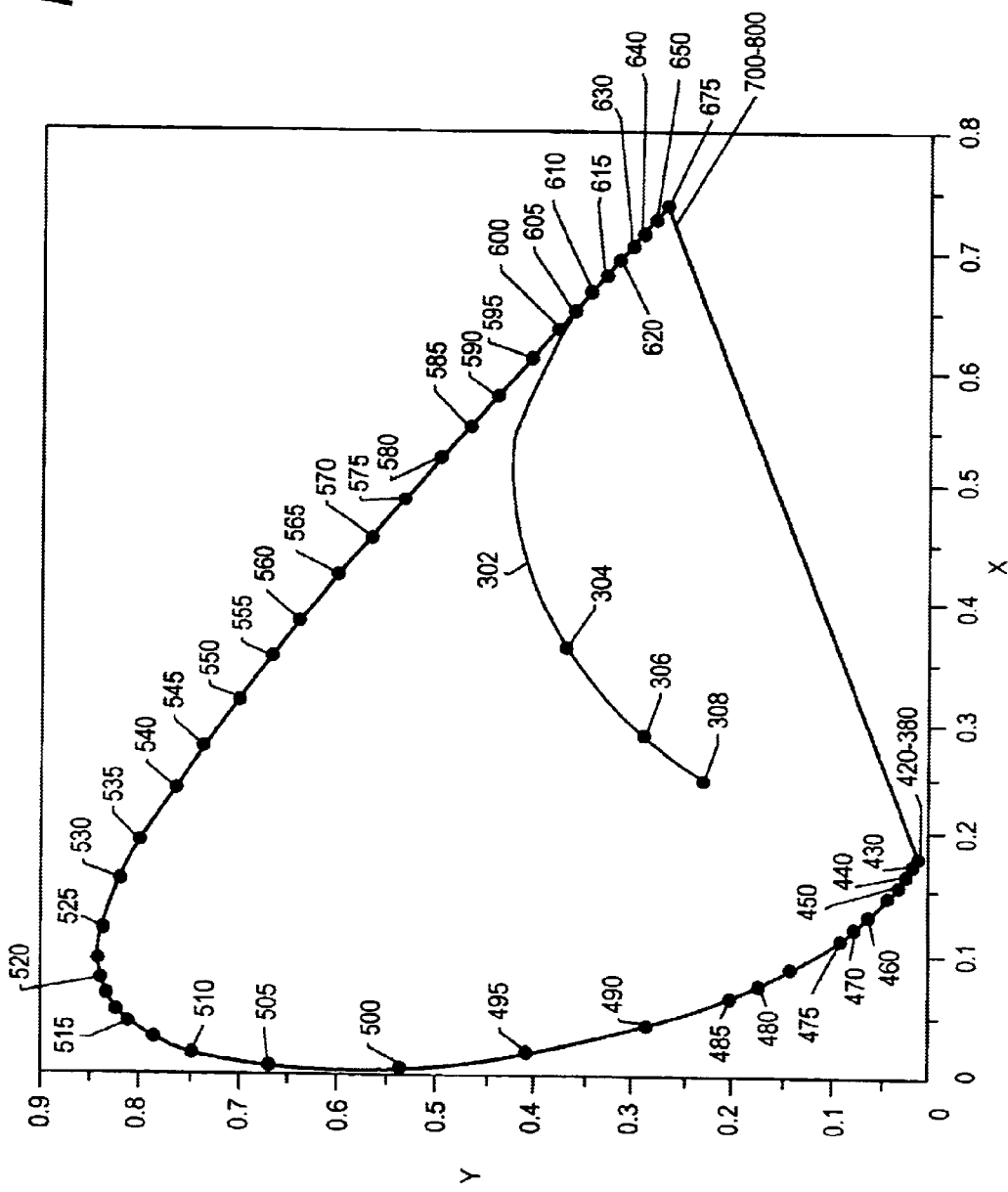
FIG. 3 is the C.I.E. Chromaticity Diagram on which tints associated with color temperatures are plotted.

In the following description, the viewer is the person wearing the eyewear incorporating the lens described herein. Reference to blocking light means that some or all of the intensity of light at a specific wavelength or in a specific range of wavelengths is blocked. Reference to a specific portion of the spectrum being blocked is not intended to be limiting, and additional portions of the spectrum may also be blocked. The same reference number used in several drawings refers to the same element.

FIG. 6 is a perspective view of a protective eyewear embodiment. In some embodiments, eyewear 600 comprises lenses 602 and 604. Lenses 602,604 may or may not correct the wearer's vision and/or magnify viewed objects. As shown in FIG. 6, lenses 602,604 are incorporated in a frameless design of eyewear 600. In other embodiments a frame supports some or all of lenses 602,604. Eyewear 600 is illustrative of various forms of protective eyewear, including eyeglasses (spectacles), goggles, and face shields. Some eyewear 600 embodiments conform to various known safety standards required for use during surgery.

Lenses 602,604 are formed to provide one or more optical features for eyewear 600. As described below, these features include blocking (i.e., preventing some or all from being passed) ultraviolet (UV) and violet light passing through the lenses, preserving the viewer's perceived brightness of an object viewed through the lenses, preserving the perceived color of an object viewed through the lenses, color balancing an object viewed through the lenses, and improving perceived contrast among like-tinted objects viewed through the lenses. Lens 602 is described in detail, and is illustrative of one or more lenses in embodiments of eyewear 600.

FIG. 7A is a cross-sectional view of lens 602 taken at cut line 7—7 on FIG. 6. As shown in FIG. 7A, lens 602 includes optically transmissive substrate 702 (e.g., glass, polycarbonate). In some embodiments substrate 702 is formed to provide the optical features described below by, for example, infusing various materials into substrate 702 (e.g., infusing a UV absorbing dye into a polycarbonate substrate). In some embodiments substrate 702 is impact-resistant.

In other embodiments, one or more layers are formed over substrate 702 to provide the optical features described below. Thus FIG. 7A shows optically transmissive layer 704 formed over front surface 706 of substrate 702. In some embodiments optically transmissive layer 708 formed over reverse surface 710 of substrate 702. Either layer 704 or 708 alone, or layers 704,708 together, provide the optical features described below. The description of layer 704 is illustrative of layer 708.

In some embodiments, layer 704 is a single, uniform layer. In other embodiments, layer 704 is made of two or more component layers. Layer 704 is formed of various materials such a plastics, resins, or single or multi-layer dielectric coatings. Layer 704 may also be formed by chemically treating surface 706 of substrate 702.

FIG. 7A also shows optional layer 712 formed over substrate 702. Layer 712 is, for example, a conventional anti-reflective (AR) coating, a conventional polarized light filter, or a conventional scratch resistant coating. Additional layers 712 may be added so that two or more of these functions are performed (e.g., both scratch resistance and AR). Layer 712 may be formed over layer 704 as shown in FIB. 7A, or may be formed in other positions such as between layer 704 and substrate 702 or over layer 708.

Substrate 702, layers 704,708, and layer 712 are formed using known methods. A particular set of spectral transmittance parameters is provided to an optical foundry that forms the substrate and/or layers to conform with the parameters. One such optical foundry is SOLA International, headquartered in Menlo Park, Calif., and its associates SOLA Optical USA in Petaluma, Calif., and SOLA Optical Italia S.P.A. in Milan, Italy. Other such foundries include Reynard Corporation of San Clemente, Calif., and II–VI Incorporated of Saxonburg, Pa.

FIG. 7B shows an embodiment of detail 714 of lens 602. As shown in FIG. 7B, layer 704 is a single layer. Layer 704 is, for example, a UV blocking layer, a blue-blocking layer, or a red-blocking layer, as described herein. Layer 712 is as described herein.

FIG. 7C shows a second embodiment of detail 714 of lens 602. As shown in FIG. 7C, layer 704 is made of a plurality of component layers, illustrated by two component layers 704a and 704b. Layer 704a is, for example, a UV-blocking layer and layer 704b is, for example, a red-blocking layer, as described herein. Layer 712 is as described herein.

FIG. 7D shows a third embodiment of detail 714 of lens 602. Layer 712a is a conventional AR layer and layer 712b is a conventional scratch-resistant layer. Layer 704a is, for example, a UV-blocking layer in accordance with the invention. In this illustration, AR layer 712a tints the perceived colors of viewed objects. This layer 704b is a color balancing layer in accordance with the invention that compensates for the tint imparted on viewed objects by AR layer 712a.

The sequence of the layers and the number of layers shown in FIGS. 7A-7D is illustrative and is varied in other embodiments.

I. UV Blocking and Brightness Preservation

Figure 8:
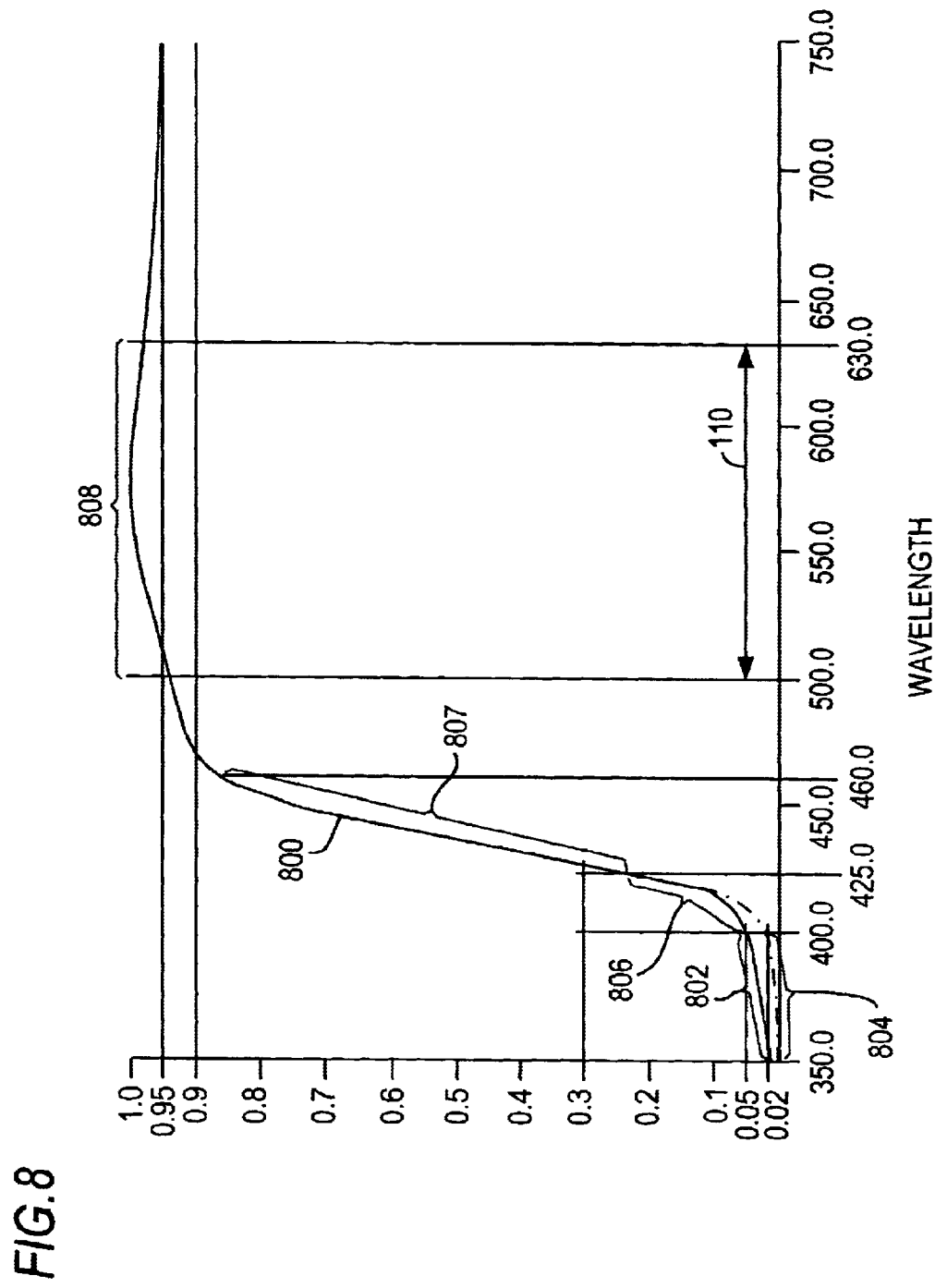
FIG. 8 is a second graph plotting normalized light intensity versus wavelength, on which a spectral transmittance distribution is plotted.

In some embodiments, lens 602 reduces the viewer's eyestrain by blocking light in the ultraviolet spectrum, and preserves the viewer's perceived brightness of the viewed scene by transmitting a high average amount of light in the brightness perception range of the visible spectrum. FIG. 8 is a graph showing light transmission versus wavelength. The spectral distribution of light transmitted by a lens 602 embodiment is shown as curve 800. Points defining curve 800 are listed in TABLE I. Curve 800 is illustrative of many spectral distributions of light transmitted by various lens 602 embodiments.

TABLE I

| $\lambda$(nm) | t ($\lambda$) |
| --- | --- |
| 400 | 0.05 |
| 410 | 0.10 |
| 420 | 0.15 |
| 430 | 0.35 |
| 440 | 0.55 |
| 450 | 0.75 |
| 460 | 0.86 |
| 470 | 0.90 |
| 480 | 0.91 |
| 490 | 0.92 |
| 500 | 0.93 |
| 510 | 0.94 |
| 520 | 0.95 |
| 530 | 0.96 |
| 540 | 0.97 |
| 550 | 0.98 |
| 560 | 0.98 |
| 570 | 0.98 |
| 580 | 0.98 |
| 590 | 0.98 |
| 600 | 0.98 |
| 610 | 0.98 |
| 620 | 0.97 |
| 630 | 0.96 |
| 640 | 0.95 |
| 650 | 0.94 |
| 660 | 0.93 |
| 670 | 0.92 |
| 680 | 0.91 |
| 690 | 0.90 |
| 700 | 0.89 |

As shown by portion 802 of curve 800 in FIG. 8, one embodiment of lens 602 blocks at least 95 percent of the UV light in UV range 106 (the short wavelength portion of the curve is omitted for clarity). In another embodiment, lens 602 blocks at least 95 percent of the average of UV light intensity in range 106. Blocking at least 80 percent of solar UV-A and UV-B light is considered sufficient for eye-strain reduction and eye protection (see ISO 8980–3:1999(E); see also ANSI Z87.1—1989 (R 1998) Practice for Occupational/ Educational Eye and Face Protection, incorporated herein by reference). Since artificial light sources such as surgical lamps may radiate UV light at higher intensities than solar, blocking at least 95 percent of such UV light intensity ensures that at least the solar minimum standard is met. Some light sources, such as CRTs, may have even higher UV light radiance, and blocking at least 98 percent of UV light in range 106 ensures that the eyes are protected and eyestrain is reduced. Thus one lens 602 embodiment provides this 98 percent UV blocking, as illustrated by portion 804 of curve 800. A maximum of 2 percent of UV-B is transmitted in some embodiments.

Portion 806 of curve 800 illustrates that some embodiments of lens 602 block at least 70 percent of the light in all far violet wavelengths from 400 nm to 425 nm to reduce eyestrain. In many surgical environments, there are an abundance of blue tinted objects such as surgical drapes. Since blue light causes eyestrain, curve 800 also blocks light in a blue spectrum (e.g., 500–440 nm). Blue light shorter than approximately 460 nm is blocked in one lens 602 embodiment, as shown by curve portion 807.

Although blocking UV light is important to reduce viewer eyestrain and eye damage, it is also important that the brightness of objects in the viewed scene be preserved as close as possible to the brightness when viewed using the naked eye. Although various brightness ranges may be defined for various photopic curves and minimum response levels, one brightness perception range may be defined between the 30 percent response points on the photopic curve. For the illustrative response curve 102, the 30 percent response points fall at approximately 500 nm and 630 nm, and the brightness perception range between these wavelengths is shown as range 110 in FIG. 1.

Thus in addition to blocking UV light as described above, embodiments of lens 602 also transmit a significant portion of the light in a human brightness perception spectrum, as illustrated by portion 808 from 500–630 nm of curve 800. People generally will not detect an intensity change less than about 5 percent (e.g., many people will not notice a shift from 100 percent to 96 percent intensity). Manufacturing and material tolerances may reduce transmittance by a few percent. Accordingly, 90 percent transmittance for all light in brightness perception range 110 is a minimum acceptable tolerance (except if a particular material otherwise having a desirable optical quality blocks light in the brightness perception range to below 90 percent for a small portion of the range such that the average transmitted intensity of light in the range remains above a specified minimum). Thus FIG. 8 shows that in one lens 602 embodiment, at least 90 percent of the light in all wavelengths in a brightness perception spectrum is transmitted. FIG. 8 further shows that in one lens 602 embodiment at least 95 percent of the average intensity of light in the human brightness perception spectrum is transmitted. Thus many viewers to not perceive a change in brightness when viewing a scene through lens 602 embodiments versus viewing the scene using the naked eye. At least 90 percent of the light in all visible spectrum wavelengths longer than the brightness perception spectrum are also transmitted.

The lens 602 spectral transmittance may be modified from the above examples. For example, in order to have 90 percent or more transmittance at wavelengths of 425 mn (where visual response becomes significant) or longer, a lens 602 embodiment in which an average of 95 percent or more of the UV light shorter than 400 nm is blocked may allow more than 5 percent average intensity transmittance in the 400–425 nm range. In addition, certain materials may have desirable optical properties, but may also incidentally block one or more wavelength ranges in the 480–580 nm brightness region. Referring to FIG. 8, for example, the shorter wavelength part of curve portion 808 falls below the 95 percent transmission level, but the average of intensities in curve portion 808 stays above the 95 percent level. Thus in some cases it is acceptable to apply a minimum specified average percentage transmission of lens 602 over a particular range instead of requiring compliance with the specified minimum at each wavelength in the range.

Figure 4:
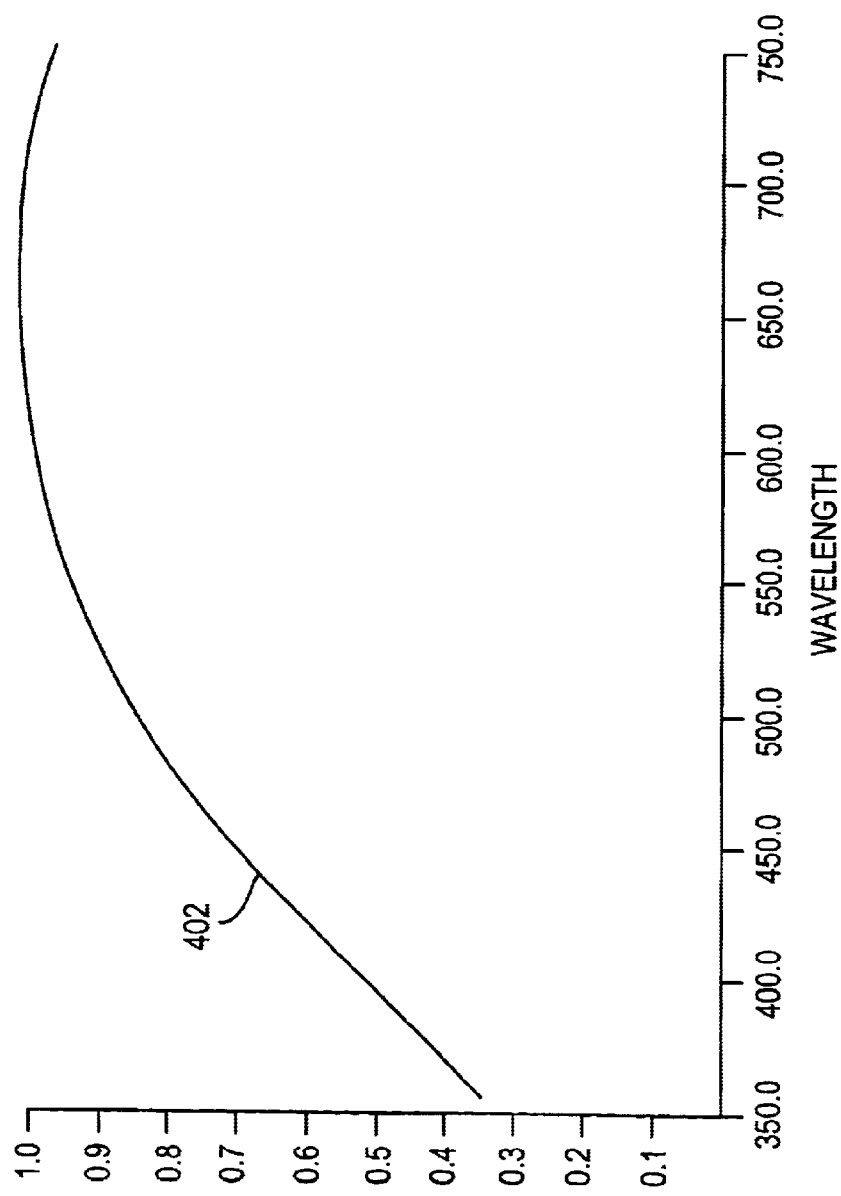
FIG. 4 is a graph plotting normalized light intensity versus wavelength, on which a spectral radiance distribution is plotted.
Figure 5:
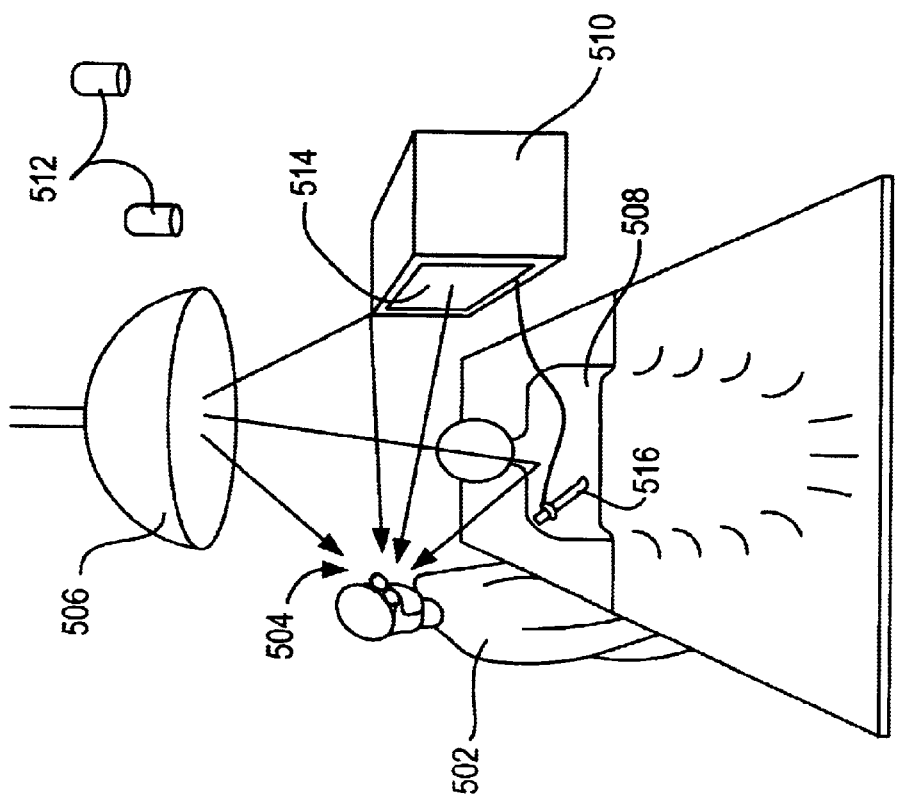
FIG. 5 is a perspective view of a typical operating theater.

The spectral distribution of light transmitted by lens 602 (e.g., curve 800) is evaluated to ensure that the distribution does not unacceptably darken a scene viewed through the lens when the scene is illuminated by a particular radiant light source (e.g., a high intensity overhead surgical lamp). That is, lens 602 is evaluated to ensure that it preserves the desired brightness of the viewed scene. In one embodiment of such an evaluation, the spectral radiance distribution for the color temperature (e.g., 4500° K.; see curve 402 in FIG. 4) of the radiant light source is determined. The determination is accomplished by, for example, measurement or from the light source manufacturer's specifications-some manufacturers supply the color temperature which approximates the light source. The actual spectral radiance distribution may be used instead of the color temperature distribution. Next, the normalized spectral radiance distribution for the color temperature light and a normalized photopic response function of the human eye (e.g., curve 102 in FIG. 1) are multiplied (combined) to form a human eye response function for the color temperature of the radiant light source. Various photopic response functions may be used. In some cases the photopic response function is chosen to be an average human response. In other cases the photopic response for a particular physiological condition (e.g., color blindness) or for a particular physical environment (e.g., unusual illumination of the viewed scene) is chosen.

Figure 9:
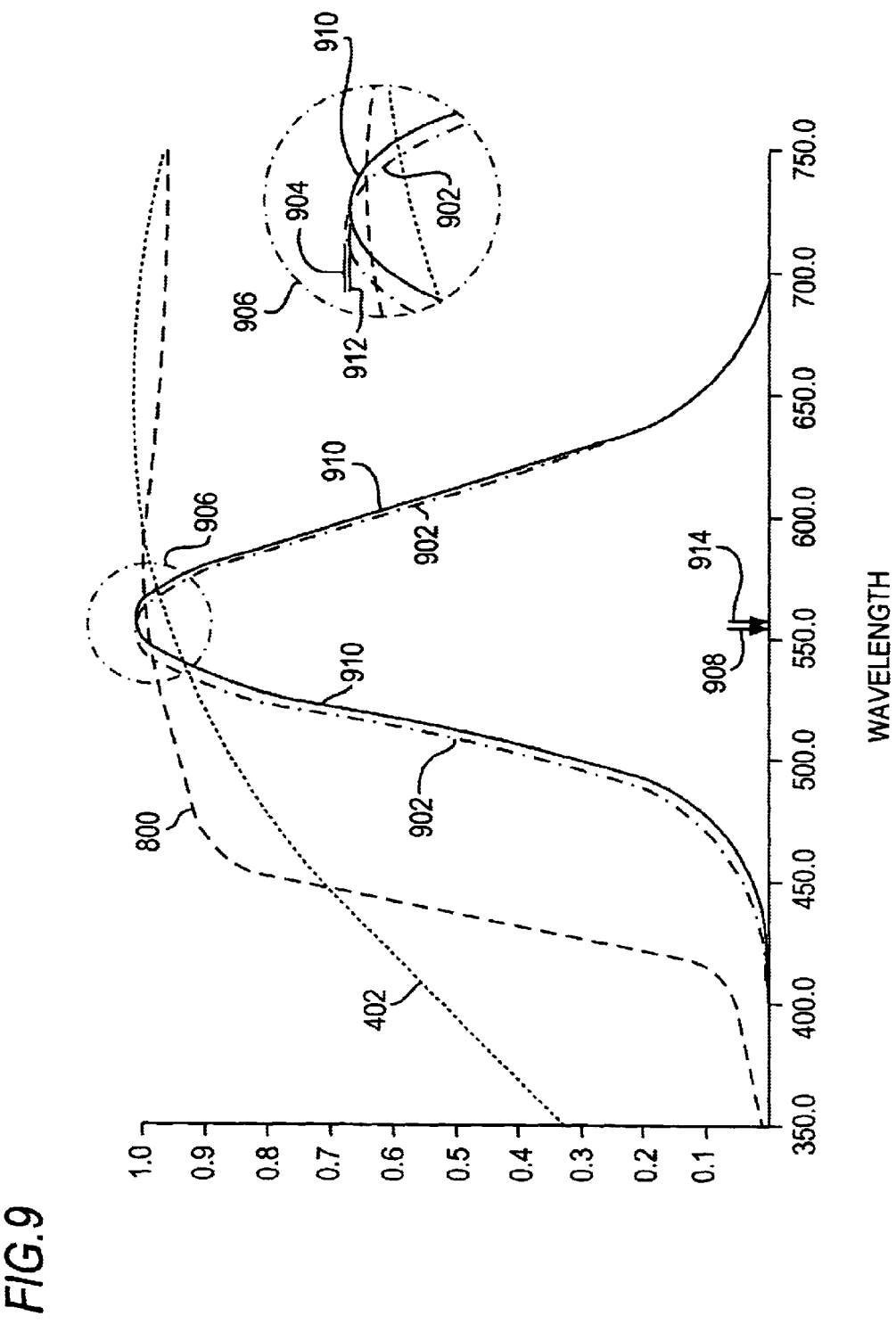
FIG. 9 is a graph plotting both normalized eye response and normalized light intensity.

FIG. 9 is a graph showing normalized spectral distributions and human eye response as a function of wavelength. Curve 902, identified by the chain line, is the combination of photopic response curve 102 (FIG. 1) and color temperature distribution curve 402. Thus, curve 902 is illustrative of a typical human eye response function for a 4500° K. color temperature light source. Curve 902 has peak eye response value 904 (shown in detail 906) at wavelength 908.

The eye response function for the color temperature is then multiplied (combined) by the spectral distribution of light transmitted by lens 602 (e.g., curve 800). The result is a combined eye response function of the eye, the light source, and lens 602, shown as solid line curve 910. Curve 910 is the combination of curve 902 and curve 800, and is illustrative of various combined eye, light source, and lens response functions. Curve 910 has peak value 912 at wavelength 914.

In order to prevent perceptible darkening (i.e., preserve desired brightness), peak value 912 of the combined eye, light source, and lens response function should be within two percent of peak value 904 of the color temperature eye response function. In addition, wavelength 914 (at which peak value 912 occurs) should be within 10 nm of wavelength 908 (at which peak value 904 occurs). The wavelength tolerance is selected to be 10 percent or less of the brightness perception range. The 2 percent peak tolerance is selected so that cumulative manufacturing and material tolerances do not cause transmission through the lens to be less than 95 percent of incident light. Therefore, curves 902 and 910 are compared to see if lens 602 causes a drop of peak value of visual response by more than 2 percent or a shift in peak response wavelength by more than 10 nm. The spectral distribution of light transmitted by lens 602 is acceptable if the peak value 912 of combined response function 910 is within two percent of the peak value 904 of the eye and color temperature response function 902, and if the wavelength 914 is within 10 nm of wavelength 908.

II. Preserving perceived color

Some lens 602 embodiments are constructed so that the viewer's perception of the color of an object viewed through lens 602 is the same as the viewer's perception of the color of the object when viewed using the naked eye. In some embodiments the viewer's color perception is preserved by ensuring that the tint of a light (e.g., originating from a 4500° K. radiant light source) that has passed through lens 602 remains within the MacAdams ellipse defined by the tint of the white light incident on lens 602.

Figure 10:
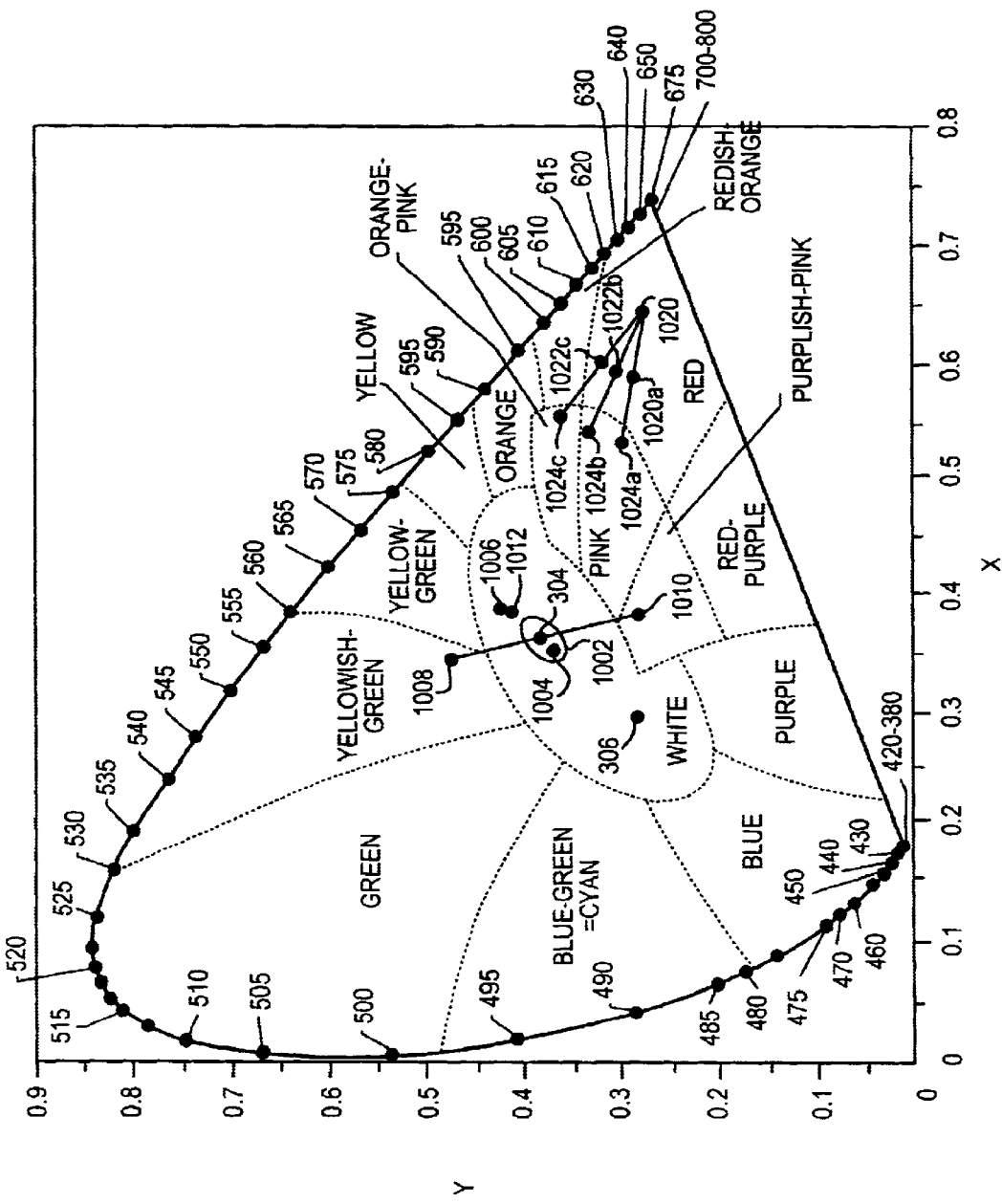
FIG. 10 is the C.I.E. Chromaticity Diagram on which illustrative tints in accordance with the invention are plotted.

In some lens 602 embodiments, the tint of light passed through the lens does not need correction to preserve color perception. Referring to FIG. 10, for example, an illustrative 4500° K. color temperature light source radiates white light at tint 304 on the C.I.E. Chromaticity Diagram. MacAdams ellipse 1002 (shown enlarged for clarity) is associated with tint 304. The radiated light having tint 304 is incident on lens 602. After passing through lens 602, the light has tint 1004. Since tint 1004 is within MacAdams ellipse 1002, the viewer's color perception is not significantly altered and no color correction is required.

In some situations, however, light passing through lens 602 without a color correction (color rebalance) is outside of the MacAdams ellipse defined by the incident light from the light source. For example, the spectral radiance of curve 800 (FIG. 8) is plotted in FIG. 10 as tint 1006 (x=0.3869, y=0.4235). Tint 1006 is fairly close to tint 304, and although some color perception is changed, the change is small. This small change is considered acceptable in order to obtain the brightness preservation function of tint 1006/distribution 800. In other instances using various light source color temperatures (tints), other lens 602 tints are chosen with the desired UV-, violet-, and/or blue-blocking capabilities, and the desired brightness preservation function, that are similar to the tint of the light source for which the lens 602 embodiment is used.

For many lens 602 tints used to block specified light wavelength ranges, color rebalancing may be done so that light originating from a light source and having a particular tint will, on exiting the lens, have a tint within the MacAdams ellipse defined by the particular tint of the light source. A tradeoff is that such a color rebalancing tint may further block light in a defined brightness perception range to below a specified minimum level (e.g., 95 percent average intensity). Referring to FIG. 10, tint 1008 may be specified to perform a desired light blocking function. Since tint 1008 is relatively far from tint 304, rebalancing tint 1010 is selected such that combined tints 1008,1010 are close to tint 304. (The relationship among the tints is not necessarily linear, but is shown as such for illustrative purposes. Actual calculation methods are known to skilled persons.) Since tints 1010 and 1008 are, for illustration, equidistant from tint 304, the combination of light having tints 1008 and 1010 is perceived by the viewer to be within MacAdams ellipse 1002. Tint 1010 is imparted to light passing through lens 602 by, for example, adding dye to substrate 702 or by adding a color balancing layer (e.g., layer 704a) of tint 1010 to the lens.

Figure 11:
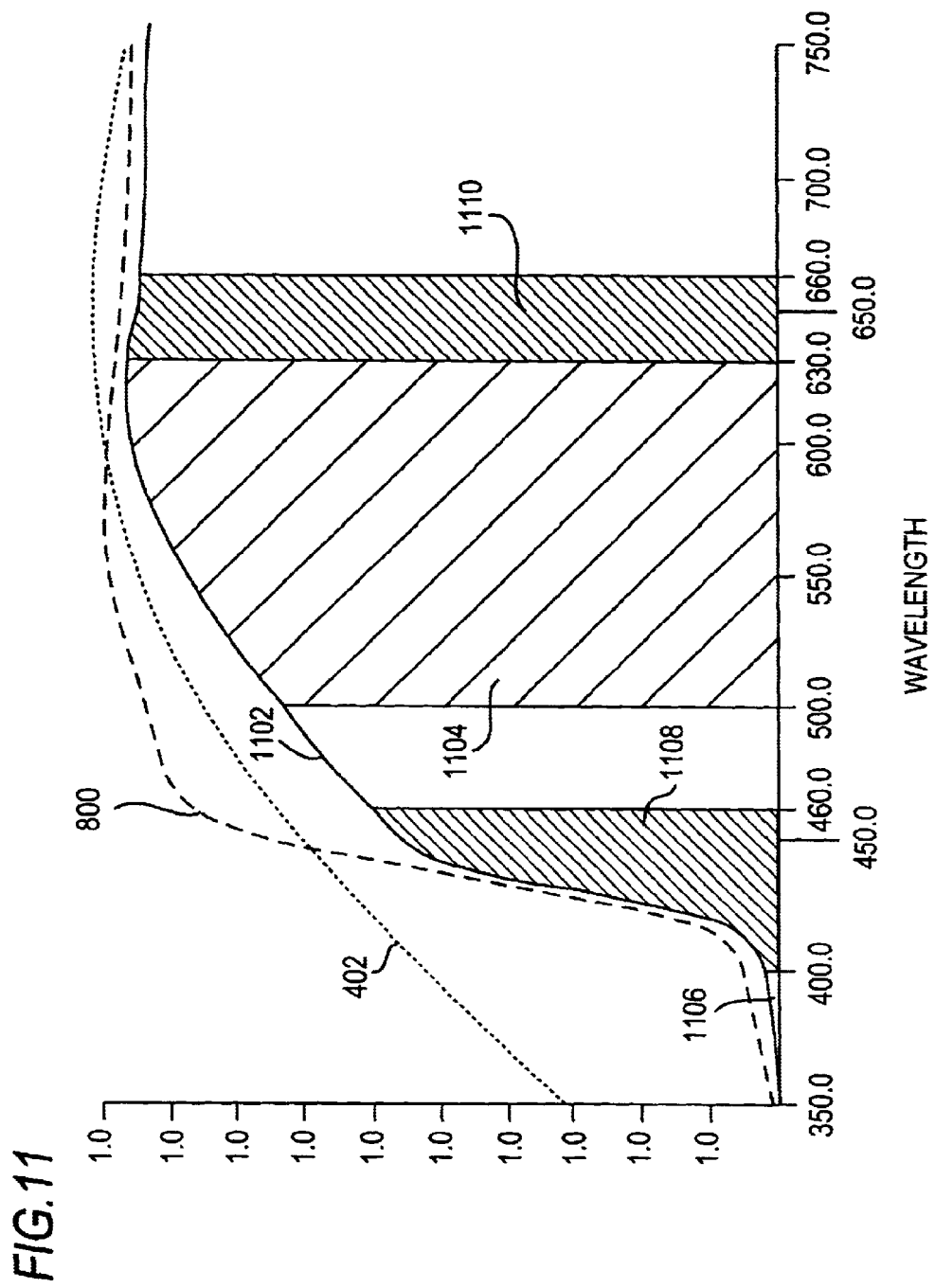
FIG. 11 is a third graph plotting normalized light intensity versus wavelength.

As discussed above, the required transmittance for lens 602 may be expressed in various ways, such as by the spectral transmittance (tint) or by the average or absolute percent luminous transmittance in particular wavelength ranges. Another way to express the required transmittance is to use an index that relates two portions of the spectral transmittance distribution for a particular light source. Referring to FIG. 11, a desired spectral transmittance distribution for lens 602 (e.g., curve 800) is combined (multiplied) with a radiance distribution of a light source (e.g., curve 402) to yield a combined spectral distribution, illustrated by curve 1102. Areas under combined spectral distribution curve 1102 portions (i.e., the combined transmittance function integrated over wavelength ranges) are compared to produce an index. It will be apparent that various wavelength ranges may be used. For example, the area $T(\lambda)_{BRIGHT}$ under curve 1102 in brightness range 110 (FIG. 1) is shown as 1104 in FIG. 11. The area $T(\lambda)_{UV}$ under curve 1102 in the UV-blocked 400–280 nm wavelength range (the shorter wavelength portion is not shown) is shown as 1106. The area $T(\lambda)_{BLUE}$ under curve 1102 in the blue-blocked 460–400 nm wavelength range is shown as 1108. The area $T(\lambda)_{RED}$ under curve 1102 in the red-blocked 660–630 nm wavelength range is shown as 1110. Thus, for an illustrative light source having radiance distribution 402, an index K for the specified UV-blocking portion of curve 800 is:

$$K_{UV} = \frac{T(\lambda)_{UV}}{T(\lambda)_{BRIGHT}}$$

Similarly, indexes for the blue- and red-blocking portions of curve 800 are:

$$K_{BLUE} = \frac{T(\lambda)_{BLUE}}{T(\lambda)_{BRIGHT}}$$

$$K_{RED} = \frac{T(\lambda)_{RED}}{T(\lambda)_{BRIGHT}}$$

For the functions and values shown in FIG. 11, such indices are approximately:

$K_{UV}=0.02$; $K_{BLUE}=0.08$; $K_{RED}=0.32$

III. Enhancing Contrast Among Objects Having Similar Tints

In some lens 602 embodiments, a red-blocking component (e.g., layer, substrate dye) reduces the amount of red light transmitted through the lens. Blocking some red light from being transmitted through lens 602 enhances the viewer's ability to resolve contrast among objects (e.g., various living tissue) having similar red tints in the viewed scene. Although all or nearly all red light may be blocked from passing through lens 602, in some embodiments a portion of red is retained in the light transmitted through the lens so that the perceived color of viewed objects is not unnecessarily tinted to an unusual color.

Figure 12:
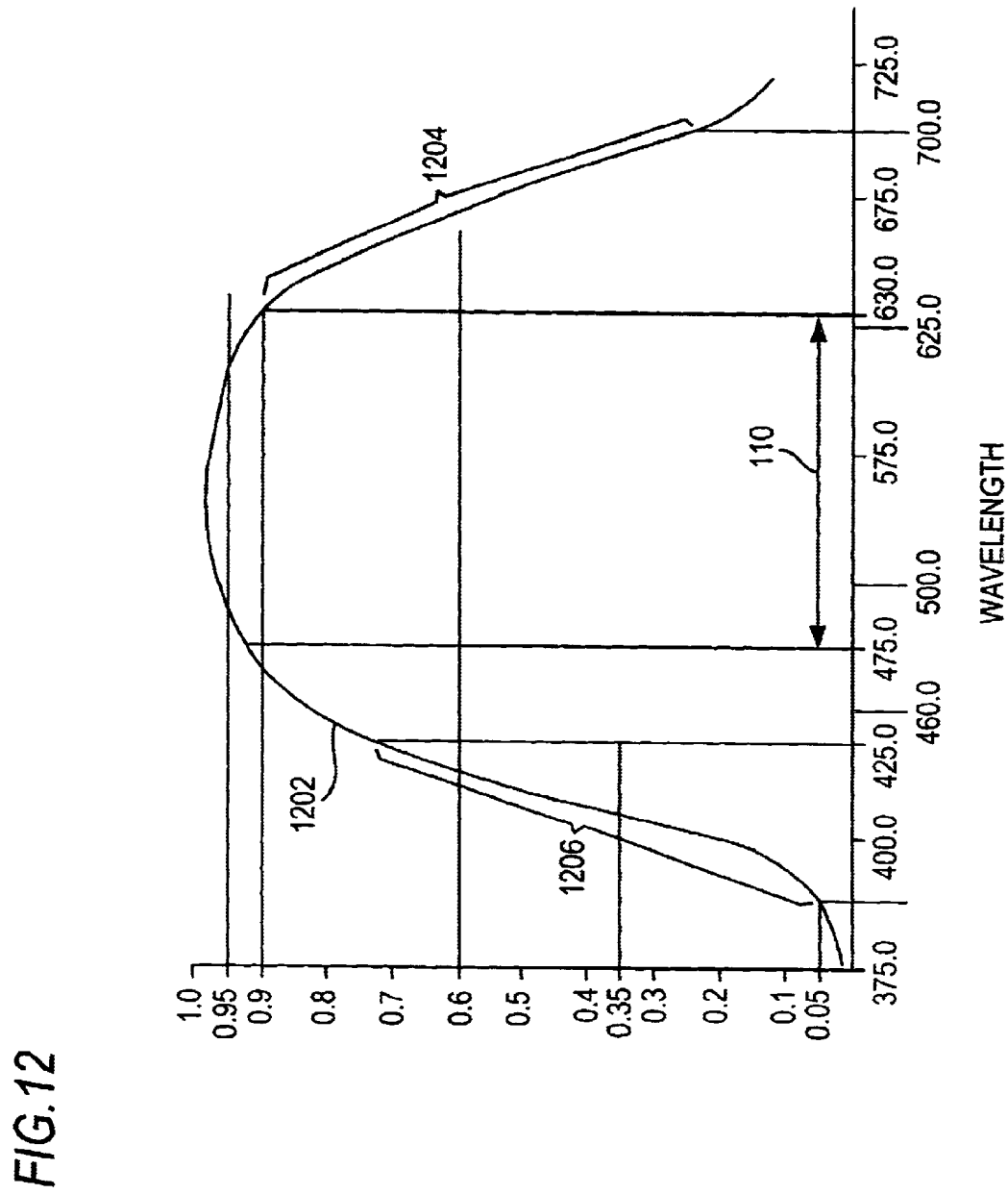
FIG. 12 is a fourth graph plotting normalized light intensity versus wavelength, on which a second spectral transmittance distribution is plotted.

FIG. 12 is a graph plotting wavelength against normalized transmission. Spectral transmission curve 1202 is an embodiment of a lens 602 tint that performs UV-, violet-, and blue-blocking with brightness perception preservation as described above. In addition, curve 1202 includes a red-blocking portion 1204 from 700–630 nM. A maximum of 60 percent of the average intensity in the 700–630 nm range, as shown by curve portion 1204. The values of curve 1202 are shown in TABLE II. The tint represented by curve 1202 may also be expressed in the CIELAB system as (L*=97.16; a*=−13.17; b*=28.00) and is shown on FIG. 10 as tint 1012 (x=0.3874; y=0.4108). Except for a very small portion of the longest wavelengths in brightness range 110, FIG. 12 shows that all wavelengths in range 110 have at least 90 percent transmittance. In addition, the average spectral transmittance within brightness range 110 is at least 95 percent. At least 95 percent of all light in the 400–280 nm UV range is blocked, and at least 98 percent of damaging UV-B light is blocked (not shown). In addition, violet and blue light in the 460–400 nm range is blocked to reduce eyestrain, as shown by portion 1206 of curve 1202. A maximum of 35 percent of the average intensity of blue/violet light in the 460–400 nm range is transmitted.

TABLE II

| λ(nm) | t (λ) |
|---|---|
| 400 | 0.05 |
| 410 | 0.1 |
| 420 | 0.15 |
| 430 | 0.3 |
| 440 | 0.45 |
| 450 | 0.6 |
| 460 | 0.75 |
| 470 | 0.8 |
| 480 | 0.85 |
| 490 | 0.9 |
| 500 | 0.92 |
| 510 | 0.93 |
| 520 | 0.94 |
| 530 | 0.95 |
| 540 | 0.97 |
| 550 | 0.98 |
| 560 | 0.975 |

TABLE II-continued

| λ(nm) | t (λ) |
|---|---|
| 570 | 0.965 |
| 580 | 0.96 |
| 590 | 0.955 |
| 600 | 0.95 |
| 610 | 0.945 |
| 620 | 0.92 |
| 630 | 0.89 |
| 640 | 0.85 |
| 650 | 0.75 |
| 660 | 0.65 |
| 670 | 0.55 |
| 680 | 0.45 |
| 690 | 0.35 |
| 700 | 0.25 |

Referring again to FIG. 10, illustrative tints are plotted to show how lens 602 improves contrast among similar red-tinted objects by blocking (subtracting) a portion of red light transmitted through the lens. The blocked portion is shown as illustrative tint 1020, which may be, for example, the spectral distribution of portion 1204 of curve 1202 (FIG. 12). Tints 1022a, 1022b, and 1022c represent the tints of three illustrative similarly tinted objects (e.g., red), such as muscle, ligament, and blood vessel, as these objects would be perceived by a viewer in a normal viewing environment, such as being illuminated by a light source having a 4500° K color temperature. By viewing the objects normally perceived as tints 1022a,1022b,1022c through a lens 602 embodiment that blocks light of tint 1020, the perceived tints are shifted away from tint 1020 and are then perceived as tints 1024a,1024b,1024c respectively. As shown in FIG. 10, the distances separating tints 1024a,1024b,1024c from each other are larger than the distances separating tints 1022a, 1022b,1022c from each other. Consequently, there is more apparent contrast among the viewed objects, and the viewer more easily distinguishes among the viewed objects. The distances among tints 1022a,1022b,1022c and 1024a,1024b, 1024c are shown exaggerated to more clearly illustrate this exemplary embodiment.

Thus contrast among red tints is improved with little loss in brightness of the illuminated scene as viewed through lens 602. By eliminated red light, however, the viewer will perceive a change in tint of the viewed scene. Brightness preservation for tints made to block specific portions of visible red light are evaluated using the method described above with reference to FIG. 9. The tint represented by curve 1202 meets the requirements to produce a combined light source (e.g., curve 402), photopic response (e.g., 102), and lens tint 1202 that has a peak value within 2 percent of the peak value of the combined light source (e.g., 402) and photopic response curve (e.g., 102), and at which the peak value occurs within 10 percent (e.g., 10 nm) of the wavelength of the peak value of the combined light source and photopic response curve. IV. Color Balancing for Light Source Tints In some instances a light source illuminating (or displaying) an object may have an undesirable color temperature. A light source with a low color temperature (e.g., some sodium lamps) causes an illuminated object to appear reddish. A light source with a high color temperature causes an illuminated object to appear bluish. Video monitors, such as those used during endoscopic surgery, typically have a high color temperature radiant spectrum and the tint of objects displayed on such video monitors is therefore shifted towards blue. Embodiments of tints used in lens 602 may alter the tint of light passing through the lens so that an illuminated object appears to be illuminated by a light source having a more desirable tint.

Referring to FIG. 10, for example, tint 306 (9300° K. color temperature, such as produced by an endoscopic video monitor) is positioned opposite tint 304 (4500° K. color temperature) from tints 1006,1012. Thus tints 1006,1012 will shift the perceived tint of objects illuminated by light having tint 306 such that the objects appear to be illuminated by a light having a tint closer to tint 304. For example, by viewing an endoscopic video monitor through a lens 602 embodiment having tint 1006, an object displayed on the video monitor will be perceived as being illuminated by a light having a tint closer to the surgical lamp light tint. The surgeon is therefore able to more effectively use color displayed on the video monitor because the displayed colors viewed through lens 602 are closer to those the surgeon expects from his or her experience during work under the surgical lamp. A similar effect can be achieved to compensate for objects illuminated by sources having color temperatures lower than those normally used for illumination by using lens 602 tints that have bluish tints. Some tints may be specified to primarily perform this color rebalancing function without preserving brightness perception to the extent described above. Such primarily color rebalancing tints may block UV as described above.

V. Production.

Tints are specified to a lens foundry (e.g., SOLA OPTICAL) using, for example, the CIELAB system as specified tint ($L_0^*$; $a_0^*$; $b_0^*$). The foundry manufactures lens 602 embodiments having the specified tint (e.g., tints 1006 and 1012) by, for example, infusing dye into a polycarbonate substrate. The tint of the manufactured lens is sampled at, for example, 10 nm intervals from 400–700 nm. The C.I.E. 1964 10° X-Y-Z color matching functions are used to reduce the samples to ($L^*_s$; $a^*_s$; $b^*_s$) to represent the actual lens tint. Then, $\Delta E$ is determined using Equation 1, where $\Delta L^* = L^*_s - L^*_0$; $\Delta a^* = a^*_s - a^*_0$; $\Delta b^* = b^*_s - b^*_0$. A $\Delta E$ of less than 3 has been achieved for tints 1006 and 1012.

In some embodiments a conventional AR coating is applied over surfaces 706 and 710 of substrate 702. A conventional scratch resistant coating is then applied over the AR coating.

The invention has been described in terms of specific embodiments. Skilled persons will understand, however, that the invention is not limited to the disclosed embodiments or applications. For example, lenses with or without optical power may be used in items other than protective eyewear, such as in optical instruments. Made sufficiently large, lenses in accordance with the invention may be placed directly over video displays, such as CRT viewing screens, to produce safer and less eyestraining outputs. Color display of certain objects on video monitors may be enhanced. Thus the scope of the invention is defined by the following claims.

We claim:

1. A lens, wherein the lens transmits a maximum of 2 percent of an average light intensity in a range of about 400–280 nanometers, the lens transmits a minimum of 95 percent of an average light intensity in a range of light wavelengths associated with eye brightness perceptions and the lens transmits a maximum of 60 percent of an average light intensity in a range of wavelengths associated with red light.

2. The lens of claim 1, wherein the range of light wavelengths associated with eye brightness perception is included in a range defined by a minimum photopic response.

3. The lens of claim 2, wherein the minimum photopic response is at least 30 percent.

4. The lens of claim 1, wherein the range of light wavelengths associated with eye brightness perception is about 630–500 nanometers.

5. The lens of claim 1, wherein the lens transmits a maximum of 35 percent of an average light intensity in a range of wavelengths associated with blue and violet light.

6. The lens of claim 5, wherein the range of wavelengths associated with blue and violet light is about 460–400 nm.

7. The lens of claim 1, wherein the lens transmits a maximum of 55 percent of an average light intensity in a range of light of about 460–425 nanometers.

8. The lens of claim 1, wherein the range of wavelengths associated with red light is about 700–630 nm.

9. The lens of claim 1 mounted in eyewear.

10. The lens of claim 9, wherein the eyewear is protective eyewear suitable for use during surgery.

11. The lens of claim 9, wherein the lens comprises a spectral transmission distribution defining a tint, the tint being such that an object displayed on a video monitor appears as if illuminated by a light source having a color temperature lower than a color temperature of the monitor.

12. The lens of claim 1, wherein the lens comprises a curved optical surface to focus light.

13. The lens of claim 1, wherein the light intensity is associated with a light source comprising a color temperature of about 4500 degrees Kelvin.

14. The lens of claim 1, wherein the light intensity is associated with a video monitor.

15. A lens comprising a tint within a $\Delta E$ of 3 compared against ($L^*=98.16$, $a^*=-8.85$, $b^*=22.91$) expressed in the CIELAB system wherein the lens transmits a maximum of 2 percent of an average light intensity in a range of about 400–280 nanometers, and wherein the lens transmits a minimum of 95 percent of an average light intensity in a range of light wavelengths associated with eye brightness perception.

16. A lens comprising a tint within a $\Delta E$ of 3 compared against ($L^*=97.16$, $a^*=-13.7$, $b^*=28.00$) expressed in the CIELAB system wherein the lens transmits a maximum of 2 percent of an average light intensity in a range of about 400–280 nanometers, and wherein the lens transmits a minimum of 95 percent of an average light intensity in a range of light wavelengths associated with eye brightness perception.

17. A lens comprising a tint:
wherein a normalized spectral radiance distribution of a light source is combined with a normalized eye response function of an eye to yield a first derived eye response function having a first peak value at a first wavelength;
wherein the first derived eye response function is combined with a normalized spectral transmittance distribution of the tint to yield a second derived eye response function having a second peak value at a second wavelength; and
wherein the second peak value is within a specified percent of the first peak value, and the second wavelength is within a specified wavelength of the first wavelength.

18. The lens of claim 17, wherein the second peak value is within two percent of the first peak value.

19. The lens of claim 17, wherein the second wavelength is within 10 nanometers of the first wavelength.

20. The lens of claim 17, wherein the normalized eye response function represents a photopic response function.

21. A lens, wherein the lens transmits a maximum of 60 percent of an average light intensity in a range of about 700–630 nanometers, and wherein the lens transmits a minimum of 95 percent of an average light intensity in a range of light wavelengths associated with eye brightness perception.

22. The lens of claim 21, wherein the range of light wavelengths associated with eye brightness perception is included in a range defines by a minimum photopic response.

23. The lens of claim 22, wherein the minimum photopic response is at least 30 percent.

24. The lens of claim 21, wherein the range of light wavelengths associated with eye brightness perception is about 630–500 nanometers.

25. A vision enhancement method comprising the at of providing a lens to be placed between and eye and a viewed object, wherein the lens transmits a maximum of 2 percent of an average light intensity in a range of about 400–280 nanometers, the lens transmits a minimum of 90 percent of an average light intensity in a range of light wavelengths associated with eye brightness perception, and the lens transmits a maximum of 60 percent of an average light intensity in a range of wavelengths associated with red light.

26. The method of claim 25, wherein the range of wavelengths associated with red light is 700–630 nm.

27. The method of claim 26, wherein the range of light wavelengths associated with eye brightness perception is 630–500 nanometers.

28. A vision enhancement method comprising the act of providing a lens to be placed between an eye and a viewed object, wherein the lens transmits a maximum of 60 percent of an average light intensity in a range of about 700–630 nanometers, and wherein the lens transmits a minimum of 95 percent of an average light intensity in a range of light wavelengths associated with eye brightness perception.

29. The method of claim 28, wherein the range of light wavelengths associated with eye brightness perception is 630–500 nanometers.

30. An optical filter, wherein the filter transmits at most an average of 2 percent over a range of about 280–400 nanometer light, transmits at least an average of 95 percent of light over a range of about 500–630 nanometer light, and transmits at most an average of 60 percent over a range of about 630–700 nanometer light.

31. The optical filter of claim 30, wherein the filter transmits at most an average of 30 percent over a range of about 400–425 nanometer light.

32. The optical filter of claim 30, wherein the filter transmits at most an average of 35 percent over a range of 400–460 nanometer light.

33. The optical filter of claim 30, wherein the optical filter comprises a curved optical surface to focus light.

34. The optical filter of claim 30, wherein the light is associated with a light source comprising a color temperature of about 4500 degrees Kelvin.

35. The optical filter of claim 30, wherein the light is associated with a light source comprising a video monitor.

36. The optical filter of claim 30, wherein the light is associated with a light source comprising a surgical lamp.

37. An optical filter, wherein the filter transmits a maximum of 60 percent of light in a range of about 700–630 nanometers light, at most 5 percent of light over a range of about 400–280 nanometers light, and a minimum of 90 percent of light over a range of about 630–500 nanometers light.

38. The optical filter of claim 37, wherein the filter transmits at most an average of 30 percent over a range of about 400–425 nanometer light.

39. The optical filter of claim wherein the filter transmits at most an average of 35 percent over a range of 400–460 nanometer light.

* * * * *

UNITED STATES PATENT AND TRADEMARK OFFICE
CERTIFICATE OF CORRECTION

PATENT NO. : 6,641,261 B2  Page 1 of 1
DATED : November 4, 2003
INVENTOR(S) : Wang et al.

It is certified that error appears in the above-identified patent and that said Letters Patent is hereby corrected as shown below:

<u>Column 14,</u>
Line 56, change "eye brightness perceptions and" to -- eye brightness perception, and --.

<u>Column 15,</u>
Lines 25 and 33, change "CIELAB system wherein" to -- CIELAB system, wherein --; and
Line 66, change "included in a range defines by" to -- included in a range defined by --.

<u>Column 16,</u>
Line 6, change "comprising the at of" to -- comprising the act of --;
Line 7, change "placed between and eye" to -- placed between an eye --; and
Line 63, change "The optical filter of claim wherein" to -- The optical filter of claim 37, wherein --.

Signed and Sealed this

Second Day of March, 2004

JON W. DUDAS
*Acting Director of the United States Patent and Trademark Office*